Figure 1:
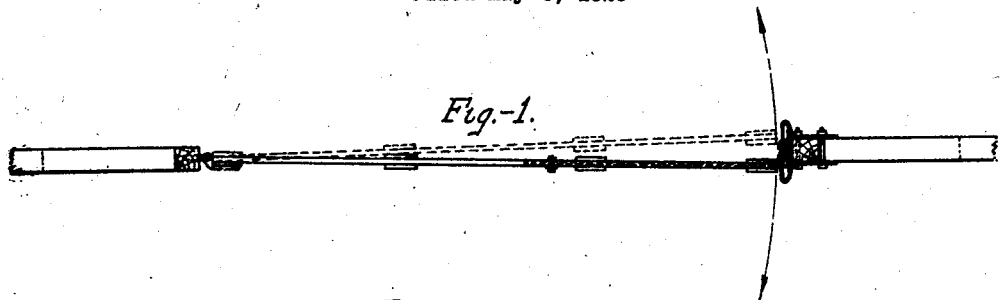
Figure 2:
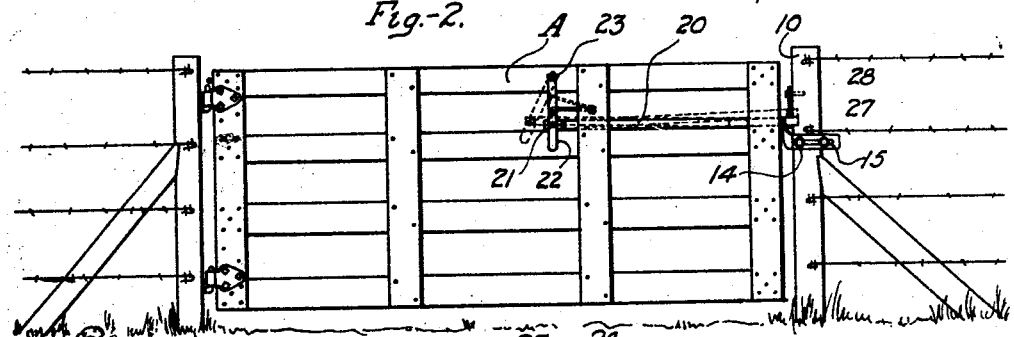
Figure 3:
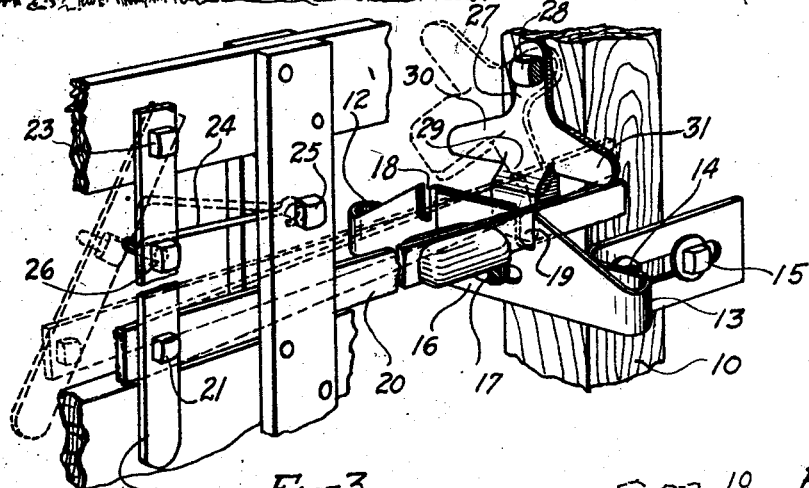
Figure 4:
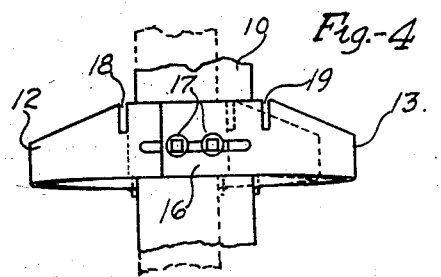

Nov. 22, 1927. 1,650,145
U. MEYER
METHOD OF DIMINISHING THE INDUCTIVE DISTURBANCES IN
SUBMARINE TELEGRAPH CABLES
Filed Dec. 14, 1925
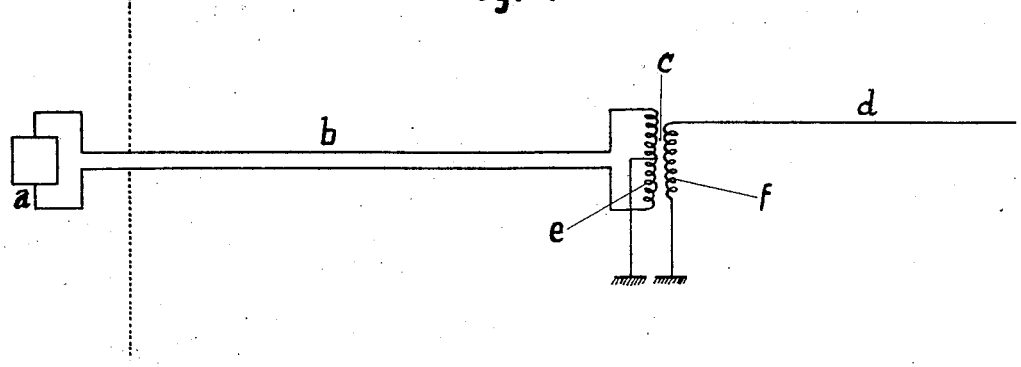
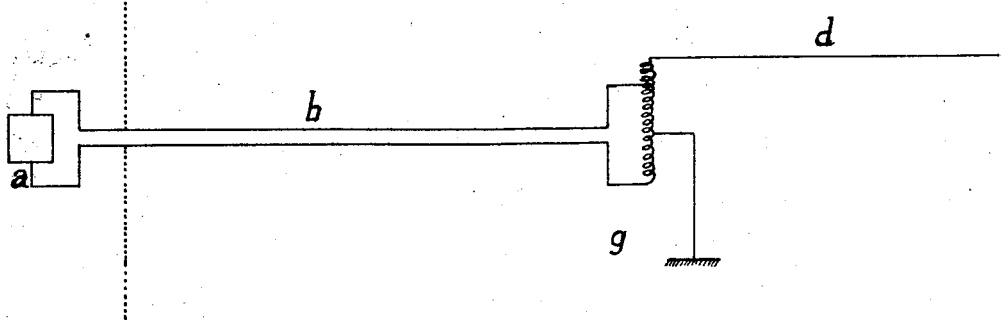
Inventor
U. Meyer,
By Mark A Clark Nov. 22, 1927.

T. J. MOORE

GATE LATCHING MECHANISM

Filed May 6, 1925

1,650,146

Witnesses
Chas. A. Barnett

Inventor.
Thomas J. Moore
By
Attorneys.